W. A. HEIZER.
AUTOMOBILE TIRE.
APPLICATION FILED NOV. 6, 1914.

1,167,173. Patented Jan. 4, 1916.

UNITED STATES PATENT OFFICE.

WILLIAM A. HEIZER, OF RICHMOND, VIRGINIA.

AUTOMOBILE-TIRE.

1,167,173.  Specification of Letters Patent.  Patented Jan. 4, 1916.

Application filed November 6, 1914. Serial No. 870,655.

*To all whom it may concern:*

Be it known that I, WILLIAM A. HEIZER, a citizen of the United States, residing at Richmond, in the county of Henrico and State of Virginia, have invented certain new and useful Improvements in Automobile-Tires, of which the following is a specification.

This invention relates to spring tires and has for its object the production of a simple and efficient means for constituting a yieldable support for the rim of a wheel so as to allow the same to give, providing the tread of the wheel should come into engagement with an obstruction.

Another object of the invention is the production of a simple and efficient reinforcing means for the convolutions which make up the spring tire and at the same time allow the convolutions to readily yield when the tire should come into engagement with an obstruction or pass over a rough road.

With these and other objects in view this invention consists of certain novel combinations, constructions, and arrangements of parts as will be hereinafter fully described and claimed.

In the accompanying drawing:—Figure 1 is a side elevation partly in section of a portion of the wheel. Fig. 2 is a longitudinal section through the felly of a wheel showing the tire applied thereto with the casing removed. Fig. 3 is a section taken on line 3—3, of Fig. 2. Fig. 4 is a section taken on line 4—4, of Fig. 2. Fig. 5 is a transverse section taken through the tire showing an embodiment of one of the retaining rods used in connection with the present invention. Fig. 6 is a detail perspective of the retaining rod illustrated in Fig. 5.

By referring to the drawings it will be seen that 1 designates the felly of the wheel which is of the usual construction and upon this felly is placed a spirally arranged coil tire 2 formed of wire or other suitable resilient material. This coil spring tire is arranged continuous around the periphery of the felly 1 of the wheel, and within the convolutions which constitute a substantial coil tubing is placed a substantially corrugated reinforcing resilient band 3, which band extends around the entire tire as illustrated in Fig. 1, having its alternate portions engaging the inner face of the outer portions of the convolutions and the inner face of the inner portions of the wire coil 2 as illustrated in Fig. 2.

A plurality of primary retaining bolts 5 are employed and carried by the felly 1, and these primary retaining bolts 5 carry nuts 6 which are threaded upon their inner ends for firmly binding the primary retaining bolts 5 in engagement with the felly. The longitudinally extending resilient band 3 constitutes a retaining band, and the outer hooked end 7 of the primary retaining bolt 5 straddles the band 3 and firmly holds the same in engagement with the felly and also holds the coiled spring tire upon the felly, in view of the fact that the band 3 passes longitudinally through the coil 2 as illustrated in Fig. 2.

A plurality of auxiliary retaining bolts 8 are interposed between the primary retaining bolts 5 and these auxiliary retaining bolts 8 have nuts 9 threaded upon their lower ends to limit the outward movement of the bolts 8. These bolts 8 are provided with hooked ends 10, which hooked ends 10 straddle the retaining band 3 and constitute an efficient support for the outer end of the band 3 and limit the outward movement thereof, thereby holding the band 3 from being entangled with the transversely wound convolutions 2 which are illustrated in Fig. 2.

For the purpose of illustration the upper end of the tire as illustrated in Fig. 2 has been shown in a dotted position as compressed as would appear when engaged by a boulder or other obstruction. This would cause the band 3 to yield inwardly and will force the bolt 8 inwardly to the position shown in dotted lines, the transversely wound convolutions 2 being compressed inwardly to the position shown in Fig. 2 in dotted lines. It should be understood that the primary retaining bolts 5 are not adapted to have movement upon the felly 1, but firmly hold the band 3 in a set position, whereas the auxiliary bolt 8 is adapted to have a reciprocatory movement through the felly 1 to allow the band 3 to have a yieldable movement. It should be further understood that this band 3 will constitute an efficient brace for reinforcing the outer portions of the coiled spring tire as is illustrated in Figs. 1 and 2.

In Figs. 5 and 6 there is shown an embodiment of the present invention wherein a different form of auxiliary bolt 8' is employed, which bolt is provided with a lower threaded end having a nut 11 threaded thereon to limit the outward movement of the bolt 8'. The bolt 8' is provided with a laterally extending substantially U-shaped portion 12 which comprises an inwardly extending finger 13. The bolt 8' is also provided with an inwardly extending finger 14, which finger is spaced intermediate between the outer end of the bolt 8' and the inwardly extending finger 13 of the substantially U-shaped portion 12. The band 3 is adapted to be engaged between the laterally extending finger 15 of the bolt 8' and the laterally extending finger 14, and in this manner be firmly held in engagement with the bolt 8'. It should be understood that owing to the peculiar construction of the outer end of the bolt 8', an efficient means has been produced for retaining the band 3 in engagement with the bolt 8' and that the band will not be likely to jump out of engagement with the bolt 8' under ordinary circumstances, although the band 3 may be readily removed therefrom when so desired.

From the foregoing description it will be seen that a very simple and efficient device has been produced for constituting a yieldable tire for use upon automobiles or other vehicles.

As is illustrated in Figs. 1 and 3, the coil tire may be provided with a rubber or fabric cover 2ª if so desired for the purpose of preventing dirt or other accumulation from entering the tire between the convolutions of the wire.

Having thus described the invention what is claimed as new, is:—

1. In a device of the class described, the combination with a rim, of a coiled spring mounted upon said rim, a bracing wire extending longitudinally through said coiled spring and provided with alternately arranged outwardly bulged portions and inwardly extending portions, bolt members passing through said rim for firmly anchoring said inwardly extending portions in engagement with said rim, and a plurality of bracing bolts slidably mounted through said rim and engaging said outwardly extending portions for constituting a brace therefor and holding said bracing wire in proper alinement with respect to said rim.

2. In a device of the class described, the combination with a rim, of a coiled spring mounted upon said rim, a bracing wire extending longitudinally through said coiled spring and provided with alternately arranged outwardly bulged portions and inwardly extending portions, bolt members passing through said rim for firmly anchoring said inwardly extending portions in engagement with said rim, and a plurality of bracing bolts slidably mounted through said rim and engaging said outwardly extending portions for constituting a brace therefor and holding said bracing wire in proper alinement with respect to said rim, said last-mentioned bolt portions provided with an overhanging hooked end, an integral lug placed within said hooked end and adapted to firmly grip said bracing wire for holding said last-mentioned bolt portion in firm engagement with said bracing wire.

In testimony whereof I affix my signature in presence of two witnesses.

WILLIAM A. HEIZER.

Witnesses:
J. E. BOWMAN,
H. M. HEFLIN.

Copies of this patent may be obtained for five cents each, by addressing the "Commissioner of Patents, Washington, D. C."